UNITED STATES PATENT OFFICE.

JACOB STAUDT, OF BONN, GERMANY.

PROCESS FOR MANUFACTURING ARTIFICIAL STONE.

No. 882,975.   Specification of Letters Patent.   Patented March 24, 1908.

Application filed September 18, 1905. Serial No. 278,945.

*To all whom it may concern:*

Be it known that I, JACOB STAUDT, chemist, a subject of the German Emperor, residing at Bonn-on-the-Rhine, 64 Arndt-strasse, Germany, have invented certain new and useful Improvements in Processes for Manufacturing Artificial Stone; and I do hereby declare the following to be a full, clear, and exact description of the invention, such as will enable others skilled in the art to which it appertains to make and use the same.

My invention refers to the manufacture of artificial stones and more especially is an improvement upon the process described in my Patent, No. 797,624 of August 22nd, 1905.

The process described in the patent referred to, consists in subjecting a powdery mixture of a stone-filling substance, (e. g. quartz-sand, ground feldspar, ground glass, emery, and the like), and a binding medium, (e. g. oils, fats or waxes) to the action of the air at a suitably elevated temperature (about 85° to 150° C. according to the binding material employed) for a certain period of time. Thereby, a stiffening of the mass is produced to such an extent, that it can be pressed into molds, the artificial stones thus formed hardening in a short time at suitable temperatures, (about 150° to 200° C).

By experiment I have found that I can considerably reduce the duration of the stiffening and hardening process, if I allow sulfur to act upon the binding medium before subjecting it to the influence of the air together with the filling substances.

I am aware that compounds of sulfur, a filling substance and an oil are already known. But in these compounds sulfur in the free state is the main constituent and the oil only plays the part of a dilutive agent. Moreover in their composition the stiffened, dry but easily compressible powder is absent which alone renders practicable the method described in my prior patent, No. 797,624, August 22, 1905.

By the addition of sulfur, according to my present invention, I intend to act upon the oily and fatty binding media in a similar manner as by the influence of the oxygen of the air. Consequently I add no more sulfur than can chemically react with the oily and fatty substances, so that the finished product contains sulfuric compound as a main constituent, but only an exceedingly small quantity of free sulfur.

Sulfur possesses a greater or less chemical affinity to the oily, fatty and waxy binding media, which are employed in the present process. With some of these substances an addition of 20 to 25% of sulfur or an easily decomposable sulfuric compound as for instance chlorid of sulfur is sufficient to cause a violent chemical reaction by which they are converted into solid rubberlike masses. With others 50% of sulfur or sulfuric compounds have to be added to produce the same result. Such solid masses are usually termed vulcanized oils.

In my present process however I prefer not to add such large quantities, because the formation of rubberlike masses from the binding substances and sulfur would prevent the production of the powderlike intermediate material which forms an essential feature of the process of my Patent No. 792,624, August 22, 1905. I prefer to employ sulfur in such quantities only that the reaction is less violent and that the effect of the sulfur upon the oily and fatty binding media is merely to convert them into masses of more or less viscous quality, such as are capable of forming a moist powder together with filling substances, which when heated and subjected to the influence of the air attains a condition in which it can be molded by pressing and in the latter part of the process can be converted into hard bodies by heating to temperatures up to 200° C. Such binding media may therefore be designated as partially vulcanized.

The advantage gained by the chemical reaction of the sulfur upon the binding media, as compared with the invention of my Patent No. 794,624, August 22, 1905, consists mainly in an acceleration of the stiffening process, because the vulcanized binding media, in order to acquire the desired degree of stiffness, need only be subjected to the action of the air for a much shorter time than non vulcanized substances. This advantage is especially important with mixtures requiring large quantities of binding medium in consequence of the employment of filling materials capable of absorbing large quantities of binding substances, such as for instance, silicious marl. The employment of large quantities of binding medium gives the finished product a hornlike or ebonitelike consistency. The reduction in the duration of the stiffening process is however of course also a substantial advantage with mixtures in which filling substances are employed that require only small quantities of binding medium. Moreover the vulcanization of the binding substances produces greater hardness in the binding substances and in consequence also in the finished products.

In order to obtain a suitable action of the sulfur upon the binding substances I may proceed in different ways:

1. I mix finely pulverized or sublimated sulfur with the pulverized stone-filling substances, e. g. with finely powered quartz-sand, quartz-powder, ground feldspar, or lime-spar, ground glass, emery, carborundum, Vienna-lime, kieselguhr or silicious earth. Then the mixture is moistened with the binding medium, which consists of oils, fats, varnishes, animal or vegetable waxes e. g. linseed oil, linseed oil-varnish, rape-oil, blubber-oil, tallow, palm-oil, or heavy rosin-oils, whereupon the mass is heated. Thereby, the finely-divided sulfur combines with the surrounding particles of the liquid binding medium.

2. I stir pulverized or sublimated sulfur into the heated binding medium, whereby the chemical combination is brought about and then moisten the filling substances with the vulcanized binding medium.

3. I dissolve sulfur in any one of its known dissolvents, stir the solution into the heated binding material and then moisten the filling substance with the mixture.

4. I mix sulfur in the shape of an easily decomposable sulfuric compound, such as for instance chlorid of sulfur, with the heated binding substances, whereby the sulfur is separated from the compound in consequence of its greater affinity to the oily and fatty binding materials and effects their vulcanization, and then moisten the filling substances with the mixture.

In all these cases by subsequent continuous heating of the moist powder I obtain a violent reaction of the sulfur with the binding substances during the stiffening process, easily recognizable by the powder acquiring a darkbrown to black color. This reaction completes and partly replaces the subsequent action of the oxygen of the air upon the binding substance and thereby effects the reduction in the duration of the stiffening process.

When binding substances are used, which react upon sulfur very violently, such as linseed oil, rape seed oil or train oil, I prefer to retard the reaction by first combining the sulfur with a binding substance that reacts less violently such as for instance resin oil or cotton seed oil and then to add the binding substance which reacts more violently. When chlorid of sulfur is used a too violent reaction can be avoided by dissolving the chlorid of sulfur in carbonic disulfid or in purified petroleum before adding it to the mixture.

Good results may be obtained for instance by proceeding as follows. 100 parts by weight of so-called kieselguhr (silicious earth) is mixed with 15 to 20 parts by weight of sublimated sulfur and 75 parts by weight of one of the oily or fatty binding substances, e. g., linseed oil. The mixture is stiffened at a temperature between 140° and 160° C. in the manner there described. Then the mass thus obtained is pressed into molds and the molded blocks hardened at a temperature of 160° to 180° C. The molded pieces thus produced have the color, appearance, fracture and approximately also the specific gravity of ebonite.

By suitably selecting the proper stone-filling substances, (e. g. by the employment of finely powdered sand, feldspar, glass), a material of stone-like consistency and of great hardness can be obtained; if filling substances are selected, which possess electrically insulating qualities, the molded pieces thus produced are excellently adapted for insulating purposes.

Having thus described the nature of my said invention, and the best means I know of carrying the same into practical effect, I claim:

1. The herein described process of manufacturing artificial stone, which consists in mixing a pulverized stone-filling material with an oxidizable and vulcanizable oily or fatty binding agent, sulfurizing or partly vulcanizing said binding agent, stiffening the mixture by exposing it to the action of the air at an elevated temperature, and then molding the mixture into stone; substantially as described.

2. The herein described process of making artificial stone, which consists in stiffening a mixture of a sulfurized or partly vulcanized oxidizable oily or fatty binding agent and a pulverized stone-filling material by exposing said mixture to the action of the air at an elevated temperature, and thereafter molding the mixture into stone; substantially as described.

3. The herein described process of making artificial stone, which consists in stiffening a mixture of a sulfurized or partly vulcanized oxidizable oily or fatty agent and pulverized filling material by exposing said mixture to the action of the air at an elevated temperature, and thereafter molding the mixture into stone, the hardening of the stone being accelerated by heating; substantially as described.

4. The herein described process of making artificial stone, which consists in mixing a refractory pulverized material with an oily or fatty binding agent, adding a sulfurizing or vulcanizing agent, the three materials in quantity being sufficient to produce a moist loose powder, stiffening the mixture by exposing it to the action of the air at an elevated temperature, and thereafter molding the mixture into stone; substantially as described.

5. The herein described process of manufacturing artificial stone, which consists in mixing 100 parts by weight of kieselguhr with from 15 to 20 parts by weight of flowers of sulfur and with 75 parts by weight of linseed oil, heating the mixture until vulcanization takes place, and exposing it to the action of air, as long as its plasticity is preserved and thereafter molding the mixture into stone; substantially as described.

In testimony whereof I have affixed my signature, in presence of two witnesses.

JACOB STAUDT.

Witnesses:
    JEAN GRUND,
    CARL GRUND.